March 17, 1936.　　K. BAUMERT ET AL　　2,034,646

PRESSURE GAUGE

Filed March 27, 1935

Inventors
Karl Baumert,
Paul Chapman.

By Thomas H. Bryce
Attorney

Patented Mar. 17, 1936

2,034,646

UNITED STATES PATENT OFFICE 2,034,646

PRESSURE GAUGE

Karl Baumert and Paul Chapman, Elizabethton, Tenn., assignors to North American Rayon Corporation, New York, N. Y., a corporation of Delaware Application March 27, 1935, Serial No. 13,260

2 Claims. (Cl. 73—110)

This invention relates to an improvement in pressure gauges but more specifically has for its purpose to devise a means whereby the cleaning of the diaphragm chamber may be facilitated.

When diaphragm pressure gauges are used it is necessary to keep the diaphragm clean of any substances which might tend to form thereon and thereby cause inaccurate readings. This is particularly true in chemical systems where viscous substances are measured. These substances coagulate and build up a coating on the diaphragm thus interfering with the resiliency thereof and causing inaccurate readings.

It is therefore one object of the present invention to devise a means for cleaning the diaphragm chamber quickly and easily.

Another object of the present invention is to devise a means for cleaning the diaphragm chamber without removing the gauge from the pipe lines.

These and other objects will in part become obvious and will in part be pointed out hereinafter.

To the attainment of the aforesaid objects and ends, our invention consists in the novel features of construction and in the combination, connection and arrangement of parts hereinafter more fully described, and then pointed out in the appended claims.

Figure 1:
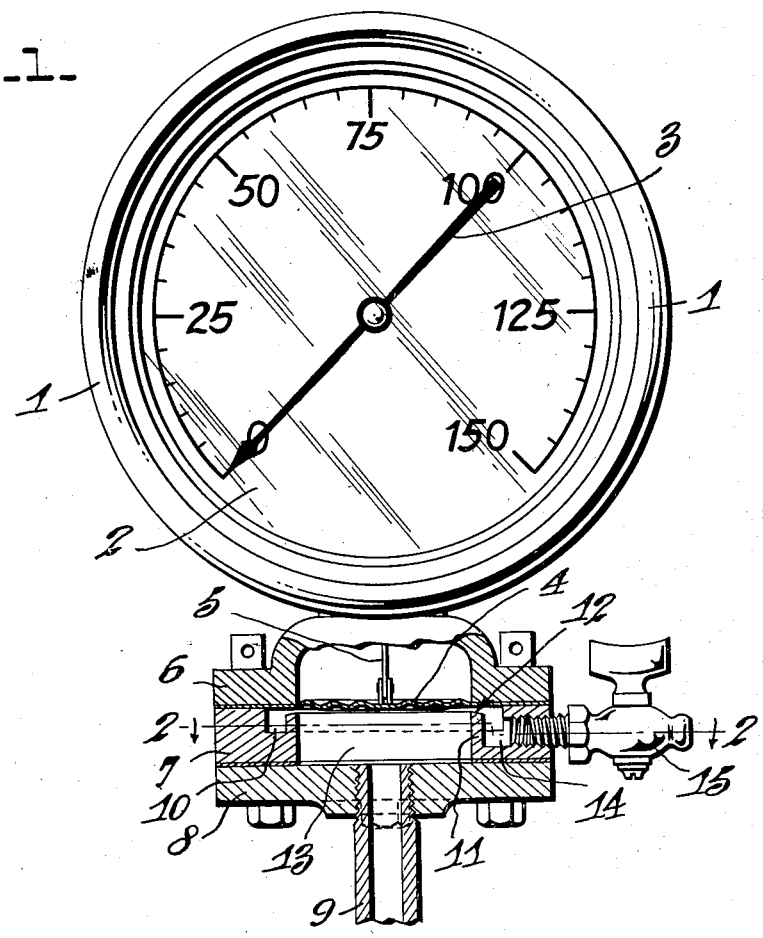
Figure 2:
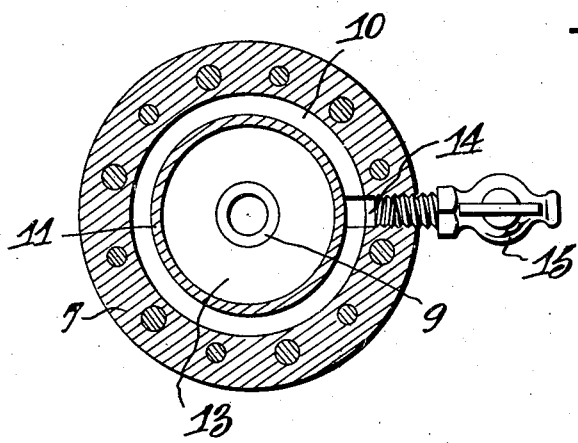

Fig. 1 is a part side elevation and part sectional view of a gauge with our invention applied thereto, and Fig. 2 is a horizontal cross section of the line 2—2 of Fig. 1.

In the drawing in which like numerals of reference indicate like parts, 1 refers to the usual type of gauge having a dial 2 and an indicator hand 3.

The diaphragm 4 has a link connection 5 which operates the indicating mechanism (not shown). The above structure is usual in the art and does not form a part of the invention except in so far as is necessary for the illustration of the use thereof.

The diaphragm 4 is inserted between the flange 6 and a removable ring 7. Joined to the bottom of the ring is a coupling flange 8 mounted on a pipe 9 through which the fluid of the system passes.

Heretofore it has been necessary, in order to clean the diaphragm, to remove the gauge 1 and ring 7. This results in cleaning the system of whatever fluid may be therein at the time and causes quite a little trouble and inconvenience.

In order to overcome these difficulties we propose to cut an annular groove 10 in the ring 7 and thereby form a circular upstanding portion 11. This portion 11 or circular wall is just out of contact with the diaphragm 4 thus forming a circular passage 12 from the chamber 13. The ring 7 is tapped at 14 and the opening there made extends to the groove 10 and allows drainage thereof.

A drain cock 15 is screwed into the tap opening 14. Whenever it is necessary to clean the diaphragm chamber a mere opening of the drain cock will suffice.

Due to the arrangement of the circular opening 12, only that liquid adjacent the diaphragm 4 will be drawn off, thus keeping the diaphragm free of coagulations. Further, the use of an annular passage adjacent the diaphragm insures a uniform drainage therefrom.

With our invention it is readily perceived that cleaning of the diaphragm 4 by removal of the gauge from the system becomes an unnecessary expedient.

If desired, radial holes might be bored in the circular wall portion 11 and a greater amount of the fluid be thereby drawn off.

From the foregoing description, taken in conjunction with the accompanying drawing, it is thought the complete construction, operation and advantages of our invention will be clear to those skilled in the art to which it relates.

In view of our invention and disclosure variations and modifications to meet individual whim or particular need will doubtless become evident to others skilled in the art, to obtain all or part of the benefits of our invention without copying the structure shown, and we therefore claim all such in so far as they fall within the reasonable spirit and scope of our invention.

Having thus described our invention, what we claim as new and desire to secure by Letters Patent is:

1. In a gauge, a diaphragm, a diaphragm chamber, said chamber having an annular passage formed in the wall of said chamber and adjacent said diaphragm, said diaphragm forming one wall of said passage and means to drain fluid from said passage.

2. In a gauge, a diaphragm, a diaphragm chamber including a wall, said chamber having an annular groove formed in the wall thereof, an upstanding flange forming the inner side of the groove, said flange extending nearly to said diaphragm whereby an annular opening is formed between said diaphragm and the top of said flange, said wall having an outlet opening therein connecting with said groove, and a drain cock mounted in said opening.

KARL BAUMERT.
PAUL CHAPMAN.